United States Patent [19]
Froidevaux

[11] Patent Number: 5,850,114
[45] Date of Patent: Dec. 15, 1998

[54] DEVICE FOR IMPROVING THE QUALITY OF AUDIO AND/OR VIDEO SIGNALS

[76] Inventor: Jean-Claude Froidevaux, Rue de la Gare 7, CH-2400 Le Locle, Switzerland

[21] Appl. No.: 798,865

[22] Filed: Feb. 11, 1997

[51] Int. Cl.$^6$ ..................................................... H01F 27/28
[52] U.S. Cl. .......................... 307/105; 307/104; 336/225; 336/229; 336/174; 336/221; 333/12; 340/310.07
[58] Field of Search ................................. 307/17, 89, 91, 307/104, 105, 106, 107; 336/225, 229, 221, 174; 333/12; 340/310.01, 310.02, 310.03, 310.07; 379/378; 327/100, 181, 177; 323/250

[56] References Cited

U.S. PATENT DOCUMENTS

| | | | |
|---|---|---|---|
| 2,922,133 | 1/1960 | Schnecke | 336/229 |
| 3,275,839 | 9/1966 | Bartik | 336/221 |
| 3,283,265 | 11/1966 | Rignelhaan | 333/12 |
| 3,392,326 | 7/1968 | Lamberton | 336/174 |
| 3,423,710 | 1/1969 | Allen | 336/212 |
| 3,617,854 | 11/1971 | Cole | 336/229 |
| 3,697,896 | 10/1972 | Sarkozi et al. | 333/12 |
| 3,742,408 | 6/1973 | Jaeger | 336/174 |
| 4,513,274 | 4/1985 | Halder | 336/173 |
| 4,622,535 | 11/1986 | Ise et al. | 361/79 |
| 4,652,855 | 3/1987 | Weikel | 340/310.07 |
| 4,682,101 | 7/1987 | Cattaneo | 323/250 |
| 4,724,381 | 2/1988 | Crimmins | 340/310.07 |
| 4,958,134 | 9/1990 | Sawa et al. | 333/12 |
| 5,272,381 | 12/1993 | Millard | 307/17 |
| 5,539,369 | 7/1996 | Selker et al. | 336/229 |

OTHER PUBLICATIONS

National Semiconductor's Technical Specifition on LM555/LM555C Timer (pp. 5–52 through 5–59.

*Primary Examiner*—William M. Shoop, Jr.
*Assistant Examiner*—Peter Ganjian
*Attorney, Agent, or Firm*—Richard K. Robinson

[57] ABSTRACT

A device for improving the quality of audio and/or video signals comprises a main electrical circuit comprising an integrated circuit arranged for producing an output pulse signal having a predetermined frequency, and a toroidal inductor having a magnetic core which has a central opening and which is surrounded by a conducting wire, said toroidal inductor being arranged to be powered by said output signal.

The device is arranged between a power supply unit and a signal processing unit which is connected by at least a phase- and a neutral conductor to said power supply unit such that said conductors pass through said central opening of said magnetic core, said toroidal inductor creating an alternating magnetic field within its core when it is powered by said output signal, so that said magnetic field induces an electric field which acts on said conductors.

4 Claims, 3 Drawing Sheets

DEVICE FOR IMPROVING THE QUALITY OF AUDIO AND/OR VIDEO SIGNALS

BACKGROUND OF THE INVENTION (1) Field of the Invention

The present invention concerns a device for improving the quality of audio and/or video signals. More specifically, the invention concerns such a device which is to be connected between a power supply unit and an audio and/or video signal processing unit which is powered by the power supply unit.

(2) Description of the Prior Art

A conventional device for improving the quality of audio and/or video signals is described in French patent application FR 2 665 809. Such device comprises a solenoid arranged around a signal-carrying conductor so as to shield the conductor and to create a magnetic field which acts on the conductor.

However, the magnetic field created in the conductor by the magnet surrounding the conductor only has a static influence on the signal-carrying cable, i.e. it has an influence only over a certain limited length, due to the fact that the magnetic field and thus its effect quickly die out. To maintain an effect over a longer distance, it would then be necessary to add several spaced apart solenoids or magnets around the signal-carrying conductor so as to repeat this effect to avoid the fading of the magnetic field. This clearly results in high cost and bulky conductors.

SUMMARY OF THE INVENTION

It is, therefore, an object of the present invention to provide a device which is capable of effectively improving the quality of audio and/or video signals.

It is another object of the present invention to provide such a device which is small in size and low in cost.

The device according to the invention is arranged between a power supply unit and a signal processing unit powered by said power supply unit and connected thereto by way of a cable. The device comprises to this effect an electrical circuit providing an output pulse signal which is fed to an toroidal inductor. The toroidal inductor is arranged so as to surround the power supply cable of the signal processing unit. When the toroidal inductor is activated by the output signal, it will generate a large alternating magnetic field thus inducing an electric field which acts on the power supply cable. Instead of obtaining a static effect on the conductor as is the case for the prior art device, the device according to the present invention creates an electrostatic effect which is much stronger and which dies out much slower than the static effect. In fact, this electrostatic effect is due to the varying magnet field which induces an electric field acting on the electrons transported in the power supply cable.

Furthermore, this effect suppresses any parasitic influence which would otherwise give rise to a certain distortion of the current. Thus, the current supplied to the signal processing unit will be a "cleaner" current, i.e. a current with less distortion which may be more easily transformed by the signal processing unit and which avoids any influence on the audio and/or video signals processed by the signal processing unit. This unit thus operates in a more efficient manner resulting in less loss and distortion and a noticeably improved quality of the processed signal.

According to the invention, the device for improving the quality of audio and/or video signals comprises a main electrical circuit comprising an integrated circuit arranged for producing an output pulse signal having a predetermined frequency, and a toroidal inductor having a magnetic core which has a central opening and which is surrounded by a conducting wire, said toroidal inductor being arranged to be powered by said output signal, said device being arranged between a power supply unit and a signal processing unit which is connected by at least a phase- and a neutral conductor to said power supply unit such that said conductors pass through said central opening of said magnetic core, said toroidal inductor creating an alternating magnetic field within its core when it is powered by said output signal, so that said magnetic field induces an electric field which acts on said conductors.

DESCRIPTION OF THE PREFERRED EMBODIMENTS

Figure 1:
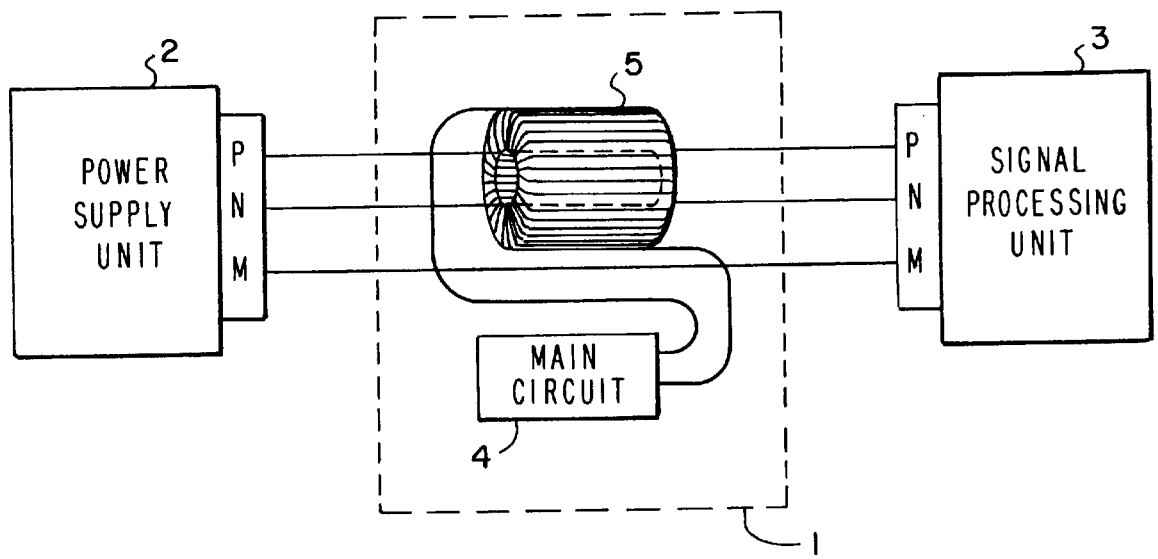
FIG. 1 represents schematically a device according to the present invention.
Figure 1A:
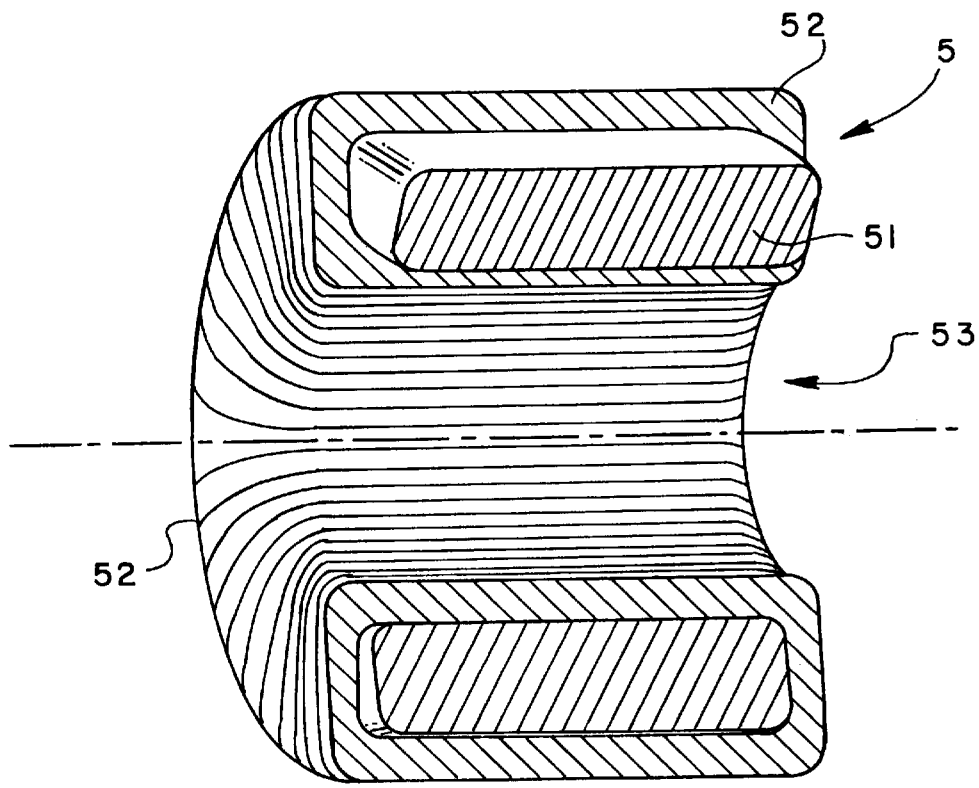
FIG. 1a shows in more detail a toroidal inductor as comprised in the device according to the invention.

Referring to FIGS. 1 and 1a, a device according to the present invention is indicated by general reference 1. Device 1 is arranged between a power supply unit 2 and a signal processing unit 3 such as an amplifier or a compact disc player or the like for processing audio and/or video signals. Power supply unit 2 may be the mains or a separate power supply used to power signal processing unit 3.

Generally, a power supply unit, e.g. the mains, comprises three conducting wires, the phase conductor, the neutral conductor and the ground conductor. To this effect, signal processing unit 3 has three input terminals, a phase terminal P, a neutral terminal N and a ground terminal M to which the respective conductors of the power supply unit are to be connected.

Device 1 comprises a main electric circuit 4 and an toroidal inductor 5 connected to this circuit. FIG. 1a shows in more detail toroidal inductor 5 which has an annular shaped magnetic core 51 surrounded by a coil 52 which is connected to main circuit 4. Toroidal inductor 5 is arranged such that the conductors P and N of signal processing unit 3 may pass through a central opening 53 of the core 51. Main circuit 4 provides an output signal for activating toroidal inductor 5 so as to create an alternating magnetic field contained completely within the magnetic core. This alternating magnetic field induces an electric field which acts on the conductors passing through the central opening 53.

Device 1 may be powered by its own power supply, e.g. a battery, but, advantageously, this device is powered by the same power supply unit used to power the signal processing unit. In this case, a by-pass of the conductors which connect power supply unit 2 to signal processing unit 4 is made which is connected to the input of main circuit 4 of device 1 so as to power the device. Each of these possible embodiments will be described in more detail hereafter.

Figure 2:
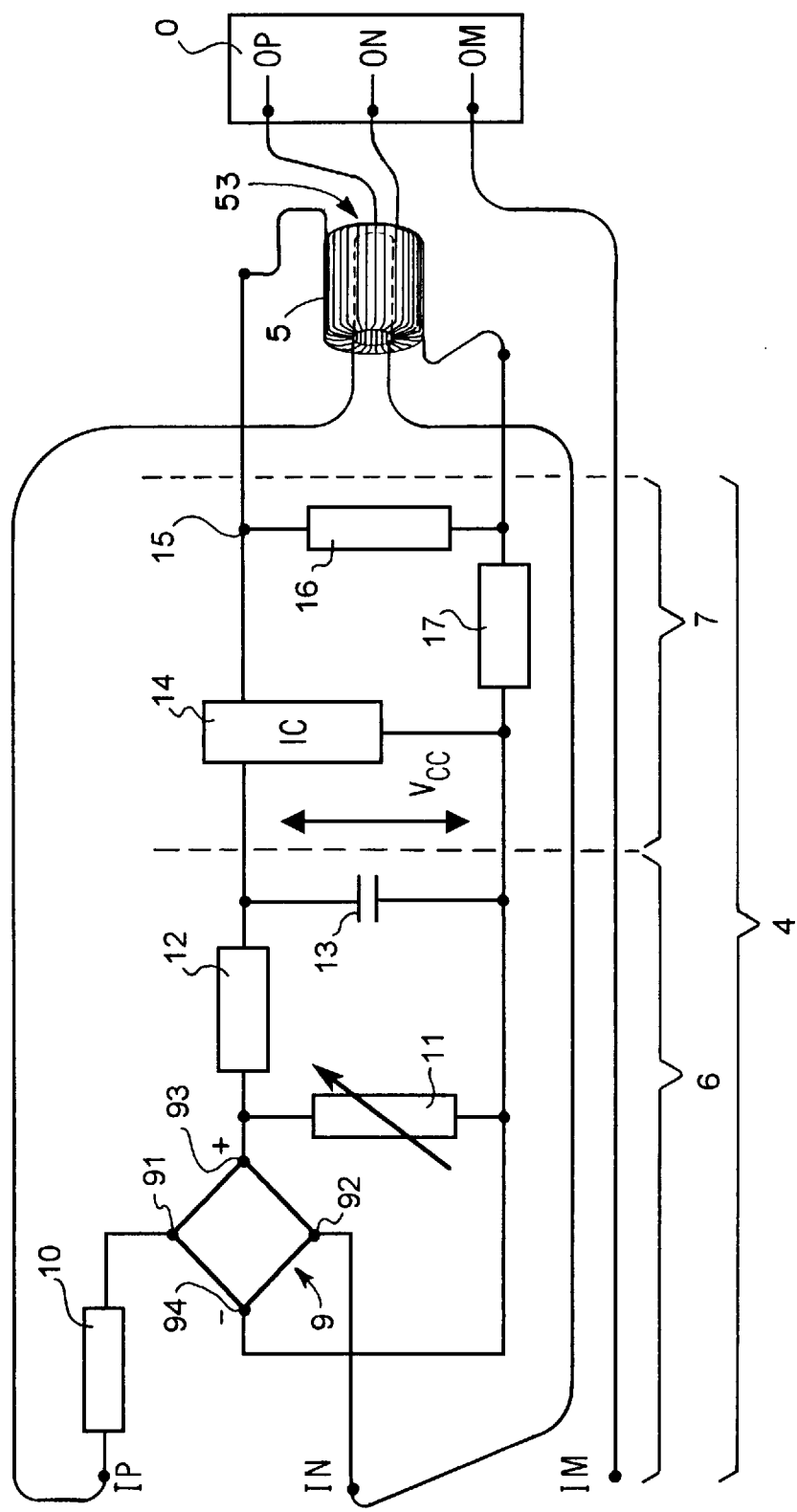
FIG. 2 represents schematically a block diagram of a first embodiment of the device of FIG. 1.

Referring now to FIG. 2 which shows in more detail a first embodiment of the device according to the present invention. In this first embodiment, device 1 is powered by a power supply unit (not shown) providing an alternating power signal, e.g. an alternating voltage to signal processing unit 3 as explained above.

To this effect, device 1 comprises a main circuit 4 which consists of an input stage 6 and an electrical circuit 7. Input stage 6 comprises input means I and has three input terminals IP, IN and IM to which the respective conductors of power supply unit 2 are to be connected for supplying the voltage needed to operate main circuit 4 and toroidal inductor 5 connected thereto.

Main circuit 4 is a passive circuit which may be mounted on a print board and which, when powered, provides an output signal for activating toroidal inductor 5.

In this embodiment, device 1 further also comprises an output 0 having three output terminals OP, ON and OM for respective connection to input terminals IP, IN, and IM in the following manner. Ground input terminal IM is directly connected to output terminal OM. Input terminals IP and IN are each connected directly by a conductor to output terminals OP and ON respectively. Both connecting conductors pass through central opening 53 of the annular core 51 of toroidal inductor 5. Finally, these output terminals OP, ON and OM are connected to input terminals P, N and M respectively of signal processing unit 3 (not shown).

In this first embodiment, a rectifying circuit is needed to obtain a constant voltage Vcc which is required for operating electronic circuit 7 of device 1. To this effect, input stage 6 of device 1 comprises a rectifier 9 for rectifying the alternating input voltage provided by the power supply unit. Such a rectifier may be obtained for example by using a Graetz-bridge circuit and is well known to a skilled person and will thus only be explained briefly. Input terminal IP is connected by way of a resistor 10 to input node 91 of bridge rectifier 9, and input terminal IN is connected to input node 92 of bridge rectifier 9. Bridge rectifier 9 has two output nodes 93, 94 providing the rectified voltage. In FIG. 2 output node 93 is the positive node whereas output node 94 is the negative node.

A variable resistor 11 is connected between nodes 93 and 94 for calibrating the rectified voltage. A further resistor 12 is connected, on the one hand, directly to node 93, and, on the other hand, is further connected via a large capacitance 13 to negative node 94 so as to obtain the desired voltage. The voltage across capacitance 13 is defined to be the operating voltage Vcc for electrical circuit 7.

Electrical circuit 7 comprises an integrated circuit 14. Integrated circuit 14 is a timer circuit and provides clock pulses at a certain frequency at its output terminal 15. Such a circuit may be the timer circuit LM555/555C made by the company National Semiconductor. The data-sheets of this circuit explain how to obtain a desired frequency of the output pulses, this frequency being determined by the load-resistor and -capacitor connected to the different terminals of integrated circuit 14 as explained in these sheets. As these components are considered part of integrated circuit 14, they are not shown in the figures. The arrangement used in the device according to the present invention produces an output signal having a predetermined frequency which is higher than the fundamental frequency of the power signal, which is for example 60 Hz in the USA and 50 Hz in Europe, and preferably, this frequency is at least twice that of the fundamental frequency. Very good results were obtained by using a frequency which is substantially twice the fundamental frequency.

The output signal from integrated circuit 14 is provided to toroidal inductor 5 which is connected in parallel with a resistance 16 to this output terminal 15. This parallel arrangement is further connected via another resistance 17 to negative node 94. Thus, electrical circuit 7 comprising integrated circuit 14 and resistors 16 and 17 provides an output signal supplied to coil 53 of toroidal inductor 5 which is used to generate an alternating magnetic field contained within its core 51.

In this example, toroidal inductor 5 is formed by a high permeable core 51 consisting of e.g. Mumetal®, around which a coil 52 is wound, the coil having a large number of turns, in this example 1100 turns. The self-inductance of the toroidal inductor thus obtained is preferably around 25 to 40 H.

When main circuit 4 is powered, the output signal generated at output terminal 15 activates toroidal inductor 5 and creates a varying magnetic field. The varying magnetic field induces an electric field which acts on the conductors passing through central opening 53. It is thus this induced electric field which acts on the electrons transported by the power signal which is then applied to signal processing unit 3. Due to this modified power signal, the Applicant has observed an improved quality of the audio and /or video signals processed by signal processing unit 3. The improvement consists in particular of n improved definition and a more stable (stereo-) image. This effect might be explained by the fact that the current provided to the signal processing unit is "cleaner", i.e. less distorted, and more stable in view of phase-shifts compared to prior art arrangements.

Figure 3:
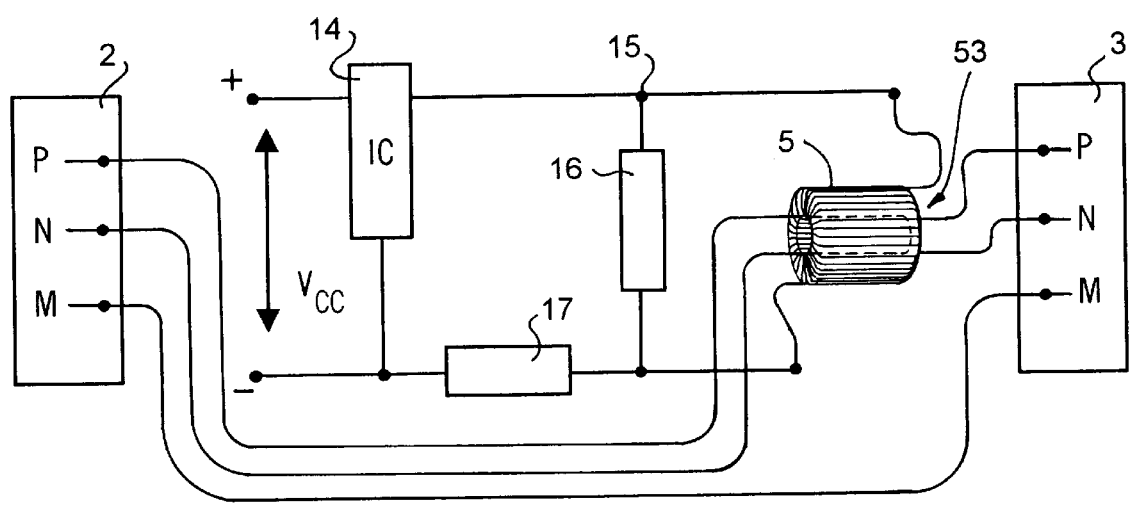
FIG. 3 represents schematically a block diagram of a second embodiment of the device of FIG. 1.

FIG. 3 shows a second embodiment of the device according to the present invention. The second embodiment only differs from the first embodiment shown in FIG. 2 in that device 1 is powered by its own power supply unit, e.g. a battery, not shown, providing directly a continuous output voltage Vcc. No rectifying means are thus required in this case.

In this embodiment, integrated circuit 14 is thus directly connected to the battery. Here too, integrated circuit 14 provides clock pulses at its output terminal 15 at a predetermined frequency as explained above. These pulses thus form an output signal used to activate toroidal inductor 5 by feeding these pulses to its coil 52.

The device according to this second embodiment does not supply itself the power to signal processing unit 3 as is the case for the first embodiment. Instead, signal processing unit 3 is directly connected to a power supply unit, e.g. the mains, to obtain its power. However, the two power conductors respectively connected to the P- and N-terminals of signal processing unit 3 pass through central opening 53 of toroidal inductor 5 so as to undergo the induced electric field created by toroidal inductor 5 similar to the first embodiment. Therefore, here too this electric field acts on the conductors as explained above.

Advantageously, device 1 is contained within an epoxy-coated box. This epoxy renders the device insensitive to any (electro-) magnetic disturbances either created by the device itself or by any other apparatus and which further ensures a large heat dissipation of the different components of device 1.

Preferably, the device according to the present invention is connected between the power supply unit, such as the mains, and a multi-socket which connects all other signal processing units to this power supply unit. As such, each signal processing unit receives the modified power signal.

It will be also noted that the device according to the invention can be series mounted without negative effect on audio and/or video signals.

Having described the preferred embodiment of this invention, it will now be apparent to one of skill in the art that other embodiments incorporating its concept may be used. It is felt, therefore, that this invention should not be limited to the disclosed embodiment, but rather should be limited only by the spirit and scope of the appended claims.

What is claimed is:

1. A device for improving the quality of audio and/or video signals and comprising a main electrical circuit comprising an integrated circuit arranged for producing an output pulse signal having a predetermined frequency, a toroidal inductor having a magnetic core which has a central opening and which is surrounded by a conducting wire, said toroidal inductor being arranged to be powered by said output signal, said device being arranged between a power supply unit and a signal processing unit which is connected by at least a phase- and a neutral conductor to said power supply unit such that said conductors pass through said central opening of said magnetic core, said toroidal inductor creating an alternating magnetic field within its core when it is powered by said output signal, so that said magnetic field induces an electric field which acts on said conductors.

2. A device according to claim 1, wherein said predetermined frequency is higher than the fundamental frequency of said power signal.

3. A device according to claim 1, wherein said predetermined frequency is substantially twice the fundamental frequency of said power signal.

4. A device according to claim 1, and further comprising power input means connected to said power supply unit, power output means connected to said signal processing unit, said power input and output means being connected to each other by said phase- and neutral conductor.

* * * * *